US012647031B2

(12) United States Patent
Bemat

(10) Patent No.: US 12,647,031 B2
(45) Date of Patent: Jun. 2, 2026

(54) HOLDUP TIME EXTENSION FOR POWER SUPPLY UNIT (PSU)

(71) Applicant: HEWLETT PACKARD ENTERPRISE DEVELOPMENT LP, Spring, TX (US)

(72) Inventor: Mohamed Amin Bemat, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 692 days.

(21) Appl. No.: 18/161,975

(22) Filed: Jan. 31, 2023

(65) Prior Publication Data

US 2024/0258913 A1 Aug. 1, 2024

(51) Int. Cl.
H02M 3/156 (2006.01)
H02M 1/32 (2007.01)

(52) U.S. Cl.
CPC ............. H02M 3/156 (2013.01); H02M 1/32 (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575;

H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;

(Continued)

(56) References Cited

U.S. PATENT DOCUMENTS

| 9,413,234 B2 * | 8/2016 | Tomasz | H02J 7/345 |
| 9,526,905 B2 * | 12/2016 | Reinke | A61N 1/378 |
| 11,431,261 B2 * | 8/2022 | Qiu | H02M 7/217 |

(Continued)

*Primary Examiner* — Jeffrey A Gblende
(74) *Attorney, Agent, or Firm* — Jones Robb PLLC

(57) ABSTRACT

A power supply unit comprises holdup circuitry and a controller. The holdup circuitry comprises a supply line, a ground line, a first holdup capacitor, a second holdup capacitor, and switching circuitry. The switching circuitry switches the holdup circuitry between a first configuration in which the first holdup capacitor and second holdup capacitor are coupled in parallel between the supply line and the ground line and a second configuration in which the first holdup capacitor and second holdup capacitor are coupled in series between the supply line and the ground line. The controller is configured to detect that an output voltage of the holdup circuitry has dropped to a threshold voltage and, in response, control the switching circuitry to cause the holdup circuitry to change from the first configuration to the second configuration.

14 Claims, 10 Drawing Sheets

100

(58) Field of Classification Search
CPC ... H02M 1/0048; H05B 39/048; B23K 11/24;
H04B 2215/069
See application file for complete search history.

(56) References Cited

U.S. PATENT DOCUMENTS

| | | | |
|---|---|---|---|
| 11,502,597 B2 * | 11/2022 | Rainer | G05B 9/02 |
| 2011/0241637 A1 | 10/2011 | Parker | |
| 2014/0126253 A1 * | 5/2014 | Humphrey | H02M 1/126 |
| | | | 363/44 |
| 2017/0126134 A1 | 5/2017 | Young | |
| 2017/0294830 A1 * | 10/2017 | Ye | H02M 1/4266 |
| 2017/0294831 A1 * | 10/2017 | Dai | G05F 5/00 |

\* cited by examiner

500

502 — Detect Voltage at Input of DC Converter has Fallen to a Threshold

504 — Open (Turn OFF) a Switch S1 Disposed Between a First Hold-up Capacitor C1 and a Supply Line 506 — Open (Turn OFF) a Switch S3 Disposed Between a Second Hold-up Capacitor and a Return Line 508 — Close (Turn ON) a Switch S2 Disposed Between the First and Second Capacitors

HOLDUP TIME EXTENSION FOR POWER SUPPLY UNIT (PSU)

INTRODUCTION

Some electronic devices, such as computers, networking devices, etc., have power supply units (PSUs) that are configured to receive input electrical power, such as mains AC power or a high-voltage DC input power, and convert the input power into one or more output power signals of forms that are suitable for components of the electronic device. For example, a PSU may receive 120V AC power and convert it into a 12V DC output power for consumption by a compute node of a server. The PSU may also comprise various other circuitry to monitor and control the power delivery, including safety circuitry to monitor for overcurrent conditions, overvoltage conditions, or other faults.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
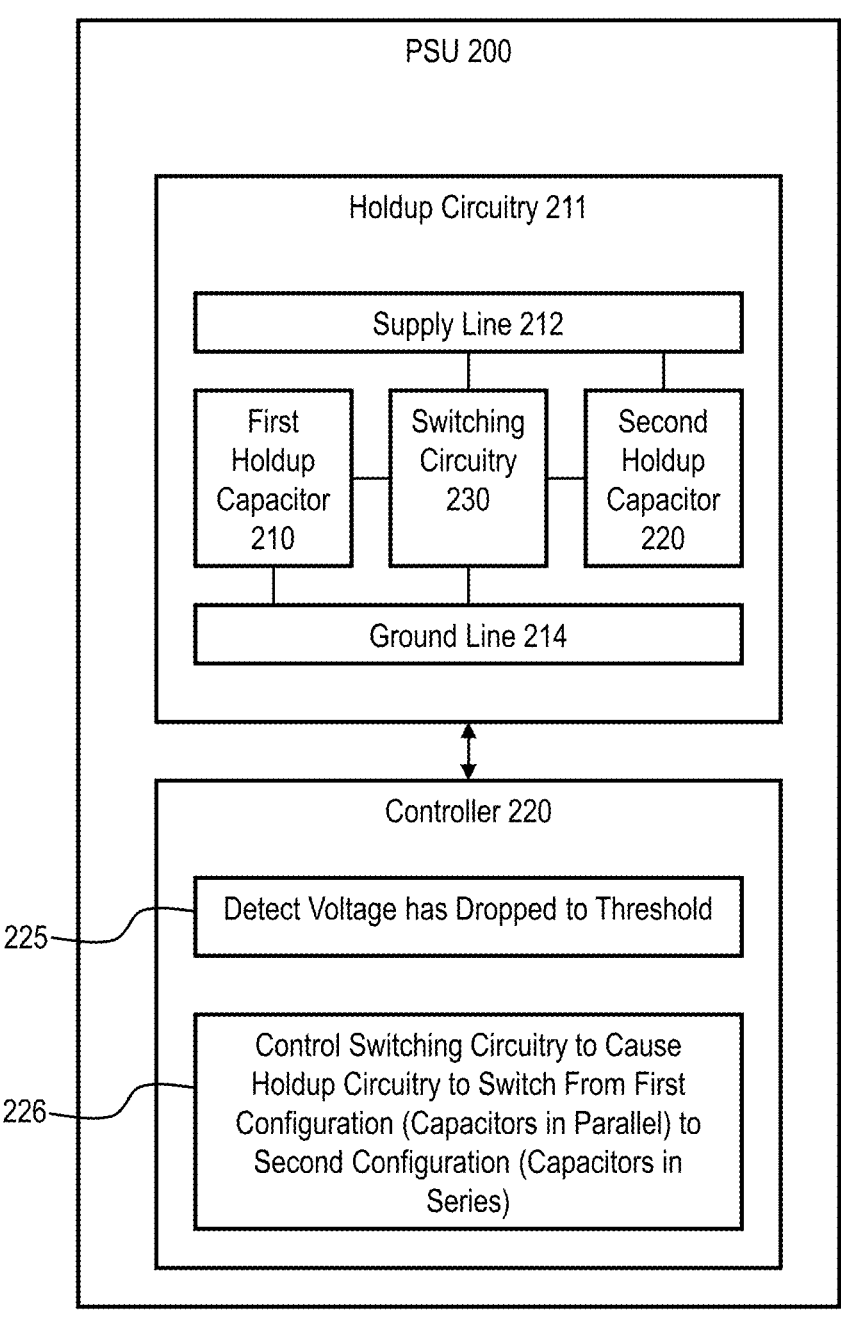
FIG. 1 is a block diagram illustrating an example power supply unit.

Many PSUs comprise what are known as holdup capacitors. These capacitors are arranged to store energy from the input power source and to, in response to the input power source being cut off, continue to supply electricity to the downstream parts of the PSU (and the electrical components powered thereby) for a limited period of time. This period of time during which the PSU can continue to supply power to the electrical device despite input power being removed is known as the holdup time of the PSU. The holdup time allows the electrical components to continue to operate despite the loss of input power. If the loss of input power is transient and the input power returns before the holdup time has elapsed, then the electronic device can continue operating without interruption as if the transient loss of power never happened. If the loss of input power is more permanent, the holdup time may allow time for an alternative power source (e.g., uninterruptable power supply (UPS), a generator, an alternative mains power source) to be brought online without cessation of operation of the electronic device in the interim.

The amount of holdup time that is available is generally dependent on the capacity of the holdup capacitors. Larger capacity capacitors will provide more holdup time. However, generally the larger the capacity of the capacitor the more it costs and also the more space it takes up on in the PSU. Thus, there is a tradeoff between the amount of holdup time that can be provided and the cost and size the PSU. It can thus be challenging to design a PSU that has both a relatively large amount of holdup time and that is small and/or cost effective.

To address these and other issues, examples disclosed herein provide a PSU with holdup time circuitry that can extend the holdup time of the PSU relative to prior designs without requiring an increase in size of the holdup capacitors, or which can provide similar holdup times as compared to prior designs while using smaller capacitors. This can allow for PSUs that have relatively longer holdup times than those previously obtained without substantially increasing their costs or size, or PSUs that have the same holdup times as previously obtained but at lower cost and/or smaller size. In other words, the holdup time circuitry can avoid (to some extent) the tradeoff mentioned above between holdup time and cost/size by boosting the amount of holdup time that can be obtained from holdup capacitors of a given capacitance.

In various examples, the holdup time circuitry comprises two holdup capacitors. In addition, the holdup time circuitry is configured to selectively switch between two configurations: a first configuration in which the two holdup capacitors are connected in parallel to one another, and a second configuration in which the two holdup capacitors are connected in series with one another. During normal operation of the PSU, the holdup time circuitry is in the first configuration (capacitors in parallel). In the event of a loss of input power, the holdup time circuitry remains in the first configuration and the capacitors will begin to discharge their stored energy in the usual fashion. Once the output voltage of the capacitors reaches a specified threshold, the holdup time circuitry is switched to the second configuration (capacitors in series). The specified threshold may be set at or near a minimum voltage at which the PSU can continue to operate. In other words, in some examples the holdup time circuitry changes to the second configuration near, and in some cases just before, the timing at which the PSU would otherwise cease being operational. The change to the second configuration causes the output voltage (the voltage across the now series-connected holdup capacitors) to increase from the threshold voltage to a much higher voltage—specifically, a voltage double that of the threshold voltage if the two capacitors have equal capacitance values. The jump in voltage allows the PSU to continue operating longer than it otherwise would have been able to. Because the PSU can continue operating for a period of time after the voltage has reached the threshold (which is the point in time where the holdup time would have normally ended in prior approaches), in examples disclosed herein the holdup time is increased relative to what it otherwise would have been in prior designs using the exact same two holdup capacitors.

Examples of the holdup time circuitry and devices, systems, and methods utilizing the same will be described below in greater detail with reference to FIGS. 1-6.

FIG. 1 illustrates a first example of a PSU 200. The PSU 200 comprises holdup circuitry 211 and a controller 220. The holdup circuitry 211 comprises a first holdup capacitor 210, a second holdup capacitor 220, switching circuitry 230, a supply (or high voltage) line 212, and a ground (or low/return voltage) line 214. An input power (not illustrated) is supplied to the supply line 212 and ground line 214, and the holdup circuitry 211 may output a voltage to subsequent stages (not illustrated) in the PSU 200 for further processing. The output voltage of the holdup circuitry 211 may be equal to the voltage across the holdup capacitors 210 (e.g., between ground line 214 and supply line 212). References herein to "ground" should be understood as referring to a local ground, not an absolute ground or earth ground. In other words, the ground line 214 carries a low reference voltage, which is regarded as ground for purposes of the circuits described herein, but which may have a non-zero voltage when compared to the ground of another circuit.

The first holdup capacitor 210 has one plate coupled to the ground line 214 and the other plate is selectively couplable to the supply line 212 or the second capacitor 220 via the switching circuitry 230. The second holdup capacitor 220 has one plate coupled to the supply line 212 and the other plate is selectively couplable to the ground line 214 or to the first holdup capacitor 210 via the switching circuitry 230. Thus, the switching circuitry 230 can switch the holdup circuitry 211 between two configurations: a first configuration in which the first capacitor 210 and the second capacitor 220 are connected in parallel between the ground line 214 and the supply line 212 (i.e., first capacitor 210 is coupled to both supply and ground lines 212 and 214, and second capacitor 220 is also coupled to both supply and ground lines 212 and 214), and a second configuration in which the first capacitor 210 and the second capacitor 212 are connected in series between the ground line 214 and the supply line 212 (i.e., the first capacitor 210 is coupled to the ground line 214 and the second capacitor 220, and the second capacitor 220 is coupled to the first capacitor 210 and the supply line 212).

The switching circuitry 230 comprises one or more switches coupled to the first holdup capacitor 210, second holdup capacitor 220, ground line 214, and supply line 212. In some examples, the switching circuitry 230 comprises at least three switches: one selectively coupling the first holdup capacitor 210 to the supply line 212, one selectively coupling the second holdup capacitor 220 to the ground line 214, and one selectively coupling the first holdup capacitor 210 to the second holdup capacitor. The switches of the switching circuitry 230 may comprise any type of electronically controlled switching devices, such as transistors (e.g., MOSFETs, JFETs, BJTs, IGBTs, etc.), thyristors, relays, etc.

The controller 220 comprises one or more microprocessors and/or dedicated hardware (e.g., logic circuits, complex programmable logic device (CPLD), field programmable gate array (FPGA), application specific integrated circuit (ASIC), etc.), which is configured to perform operations 225 and 226. The controller 220 may be configured to perform these operations by virtue of storing computer program code (e.g., machine readable instructions) corresponding to instructions that cause performance of operations 225 and 226 and/or by virtue of logic hard coded into the controller 220. In some examples, controller 220 may comprise multiple physically distinct devices that work together to perform the operations. For example, one part of controller 220 may control one switch while another part of controller 220 may control another switch. In other examples, controller 220 may comprise a single device.

Operation 225 comprise detecting that an output voltage of the holdup circuitry 211 (e.g., a voltage across the capacitors 210 and 220) has dropped to a threshold level. In some examples, the threshold may be equal to a minimum voltage that a DC-to-DC converter downstream of the holdup circuitry 211 will accept as an input voltage. The voltage may drop to the threshold level because input power to the PSU 200 has ceased.

Operations 226 compromise, in response to detecting the output voltage reach the threshold, controlling the switching circuitry 230 (e.g., by sending driving signals thereto) to cause the holdup circuitry 211 to switch between the first configuration and the second configuration. By switching from the first configuration to the second configuration, the voltage across the capacitors is increased (e.g., doubled), and thus the holdup capacitors may continue to discharge even after reaching the threshold voltage. The PSU would have normally shut down upon reaching the threshold voltage in prior designs (i.e., reaching the threshold voltage may correspond to an end of the holdup time in prior designs), but because in the present example the voltage is doubled once it reaches the threshold (due to the switching of the circuitry to the second configuration) the PSU can now continue operating for additional time. The PSU will keep operating until the capacitors have discharged and again reach the threshold voltage for a second dime. This extra time for discharging comprises additional holdup time that otherwise would not have been available. This and other aspects will be described in greater detail below with reference to FIGS. 2A-4.

Figure 2A:
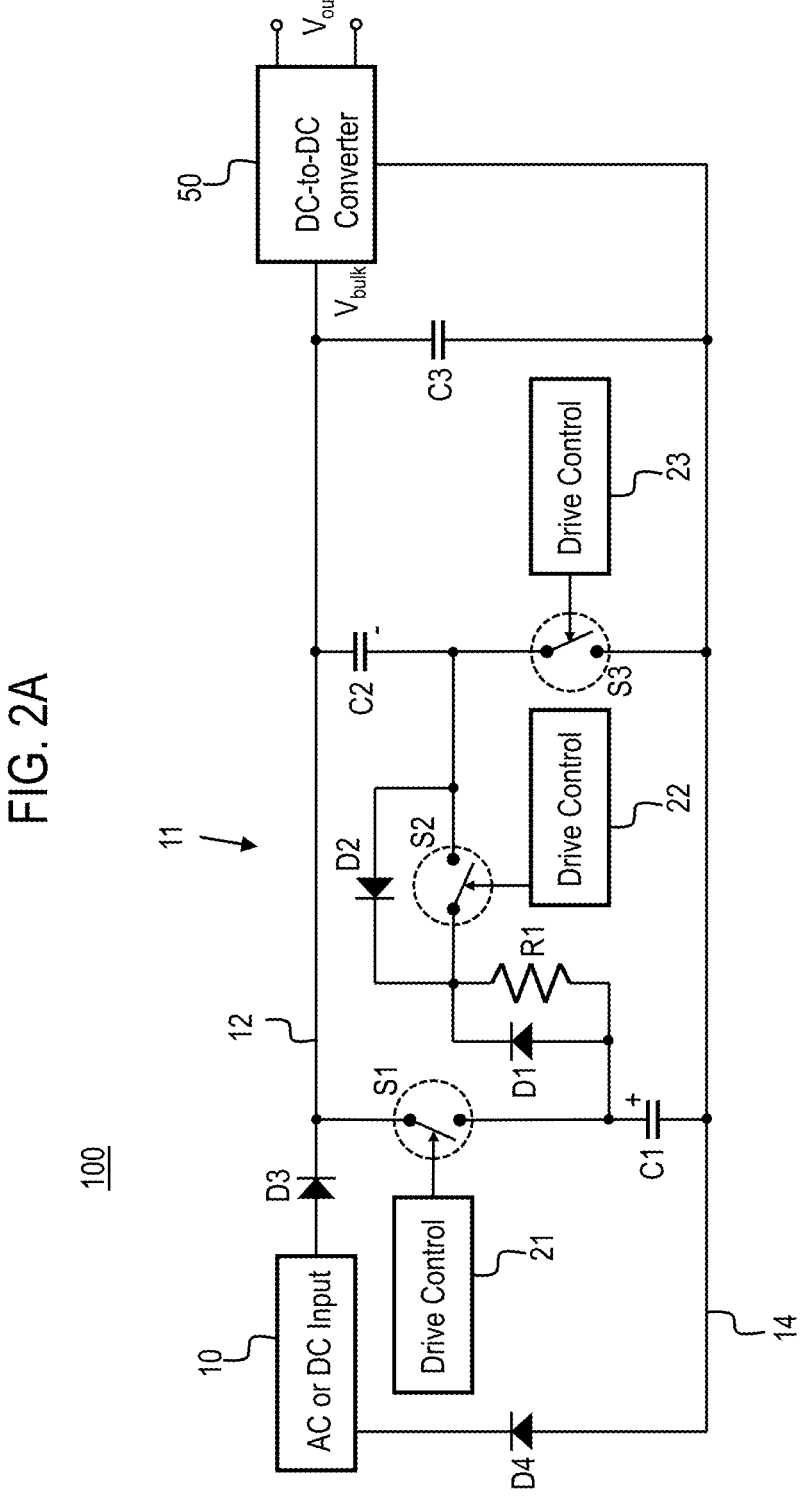
FIG. 2A is a schematic diagram illustrating electrical circuitry of a second example power supply in a first state.
Figure 2B:
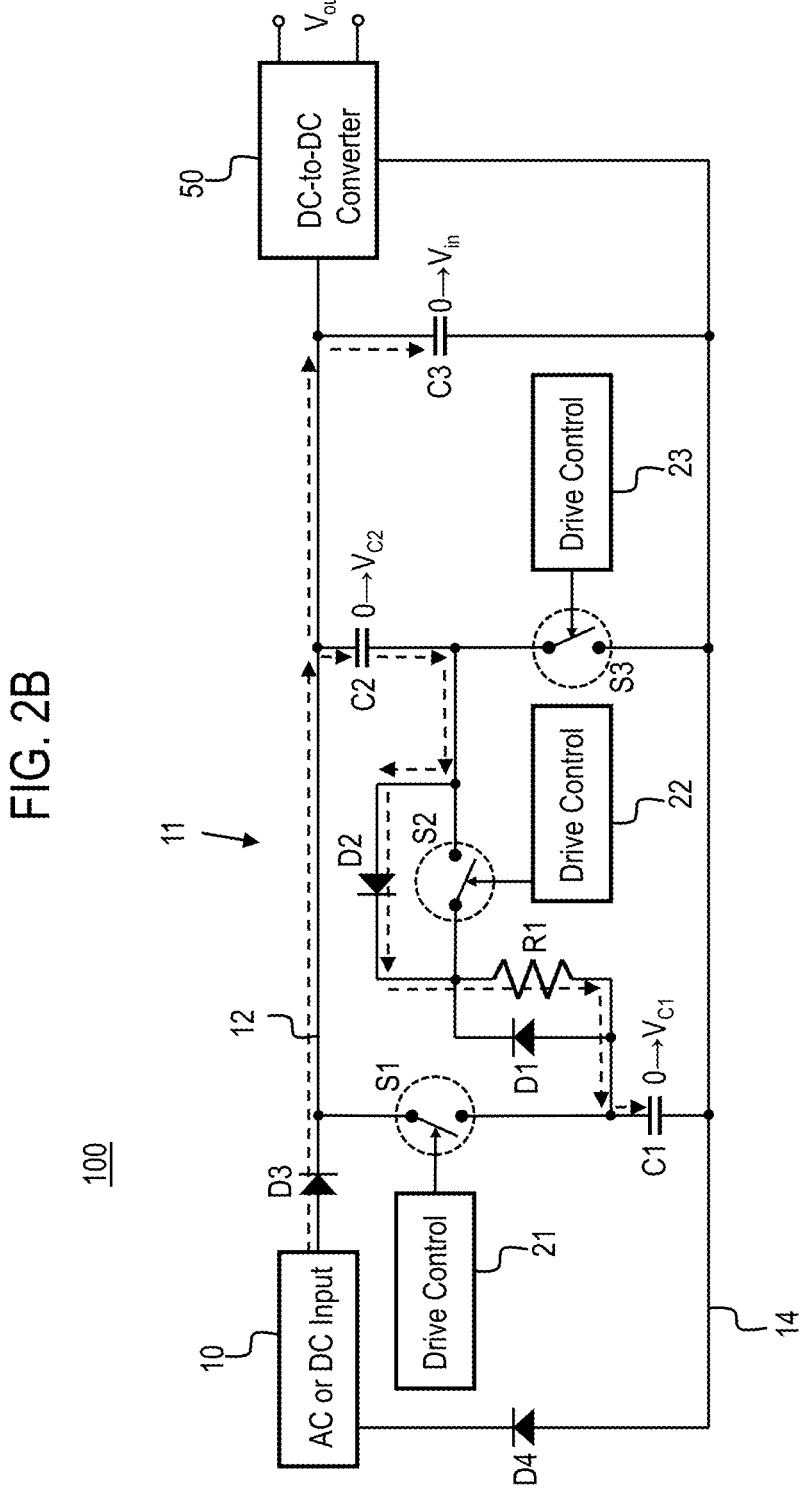
FIG. 2B is a schematic diagram illustrating electrical circuitry of the second power supply in a second state.
Figure 2C:
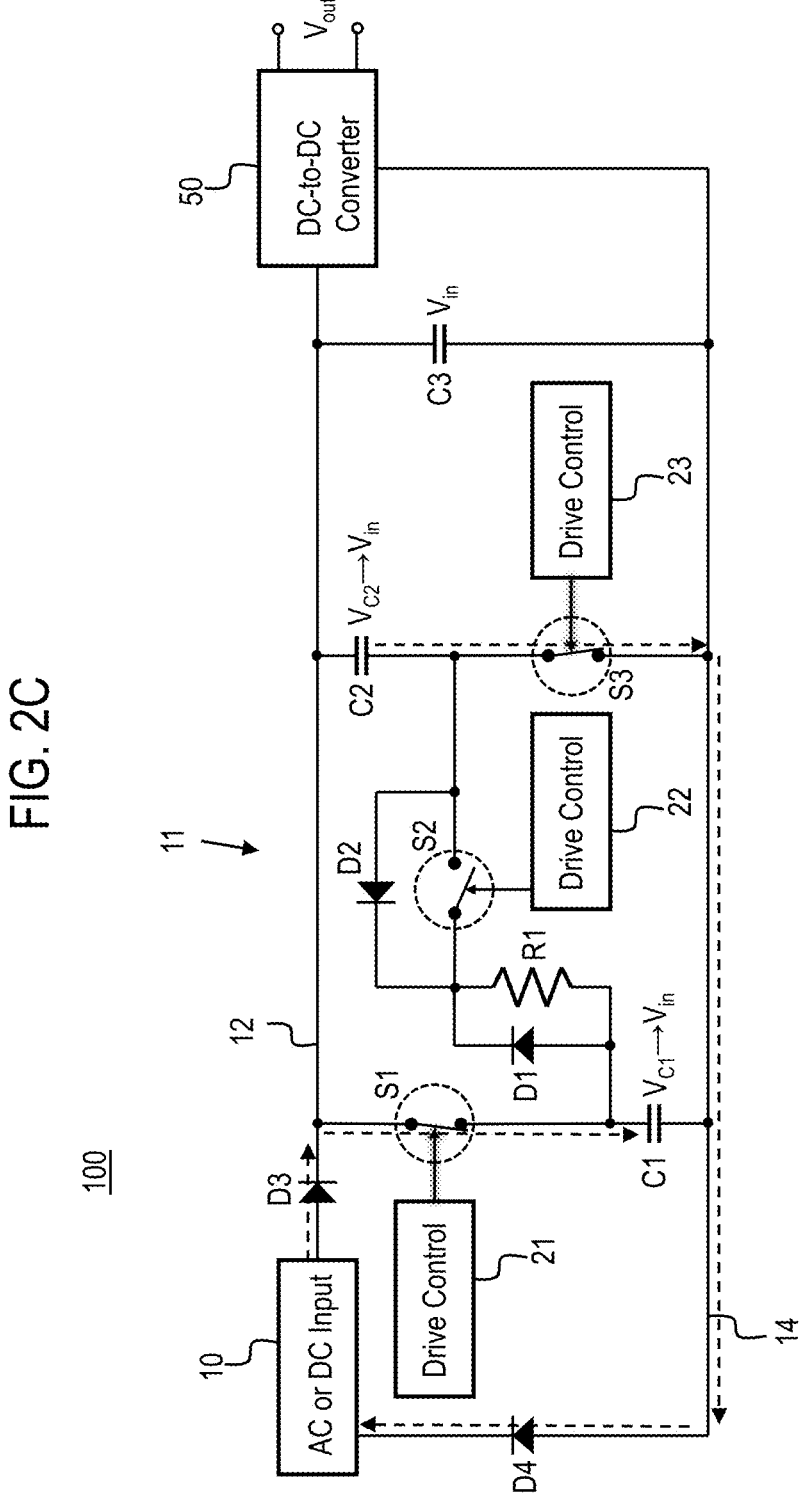
FIG. 2C is a schematic diagram illustrating electrical circuitry of the second power supply in a third state.
Figure 3A:
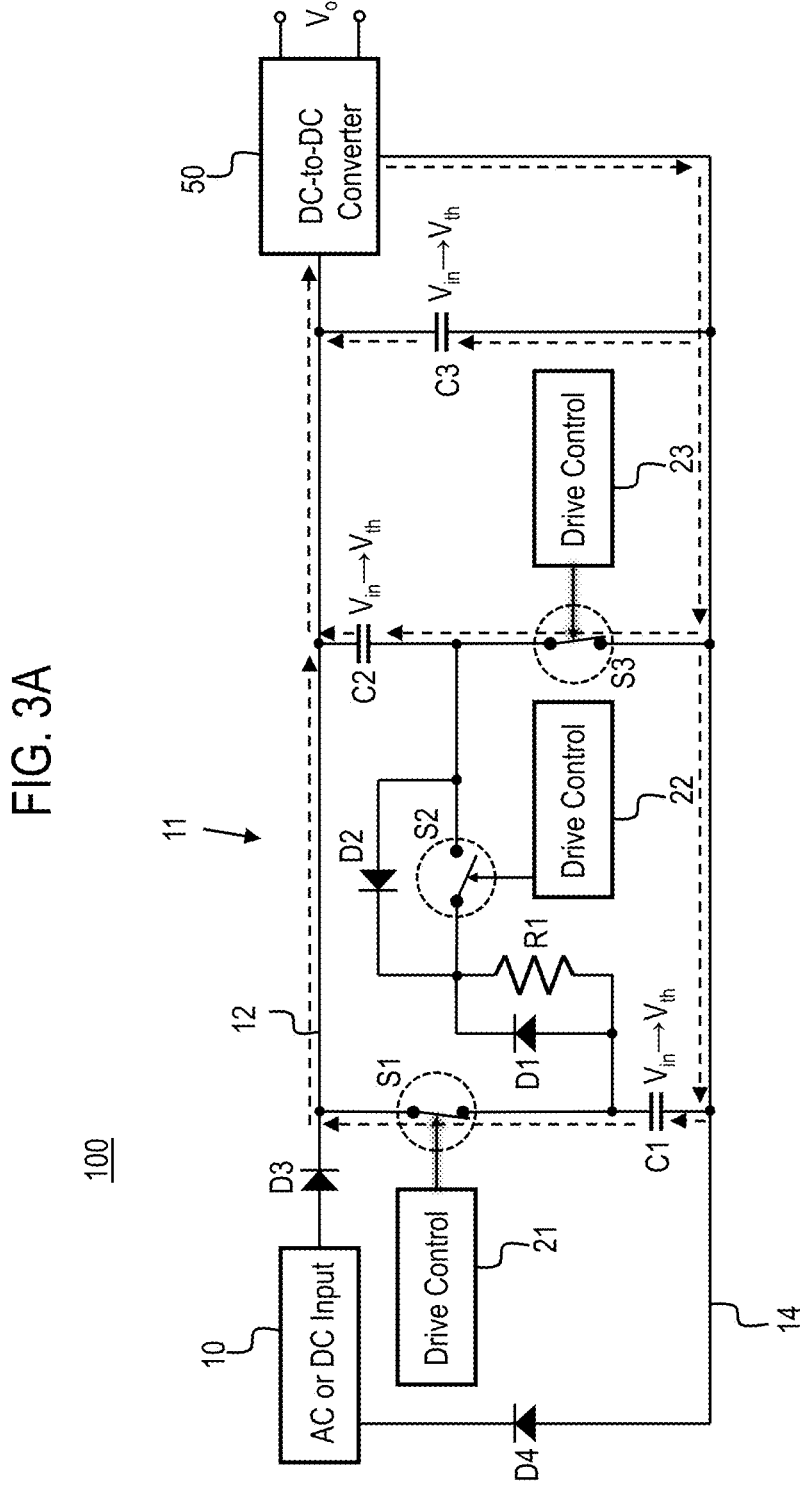
FIG. 3A is a schematic diagram illustrating electrical circuitry of the second power supply in a fourth state.
Figure 3B:
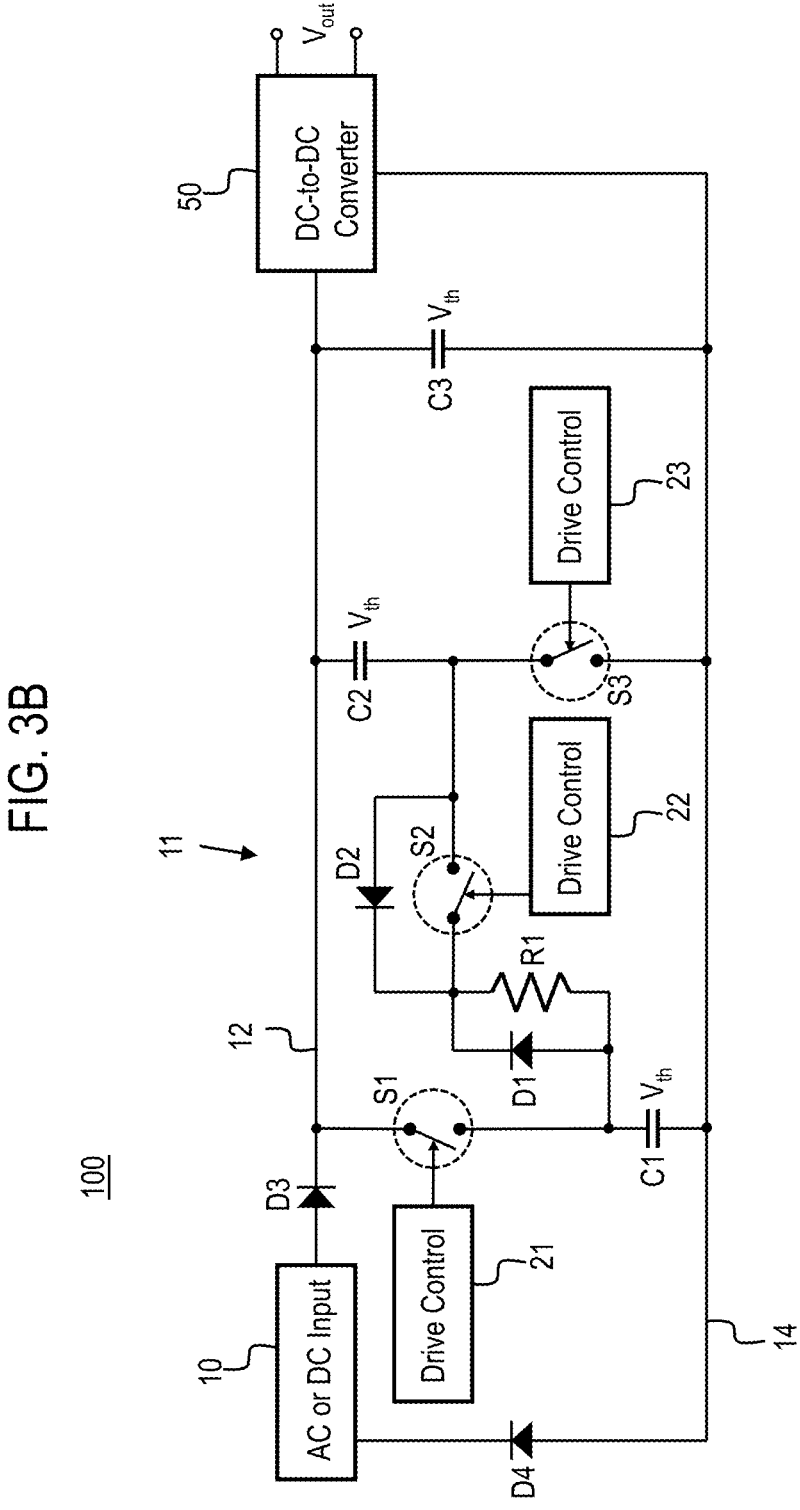
FIG. 3B is a schematic diagram illustrating electrical circuitry of the second power supply in a fifth state.
Figure 3C:
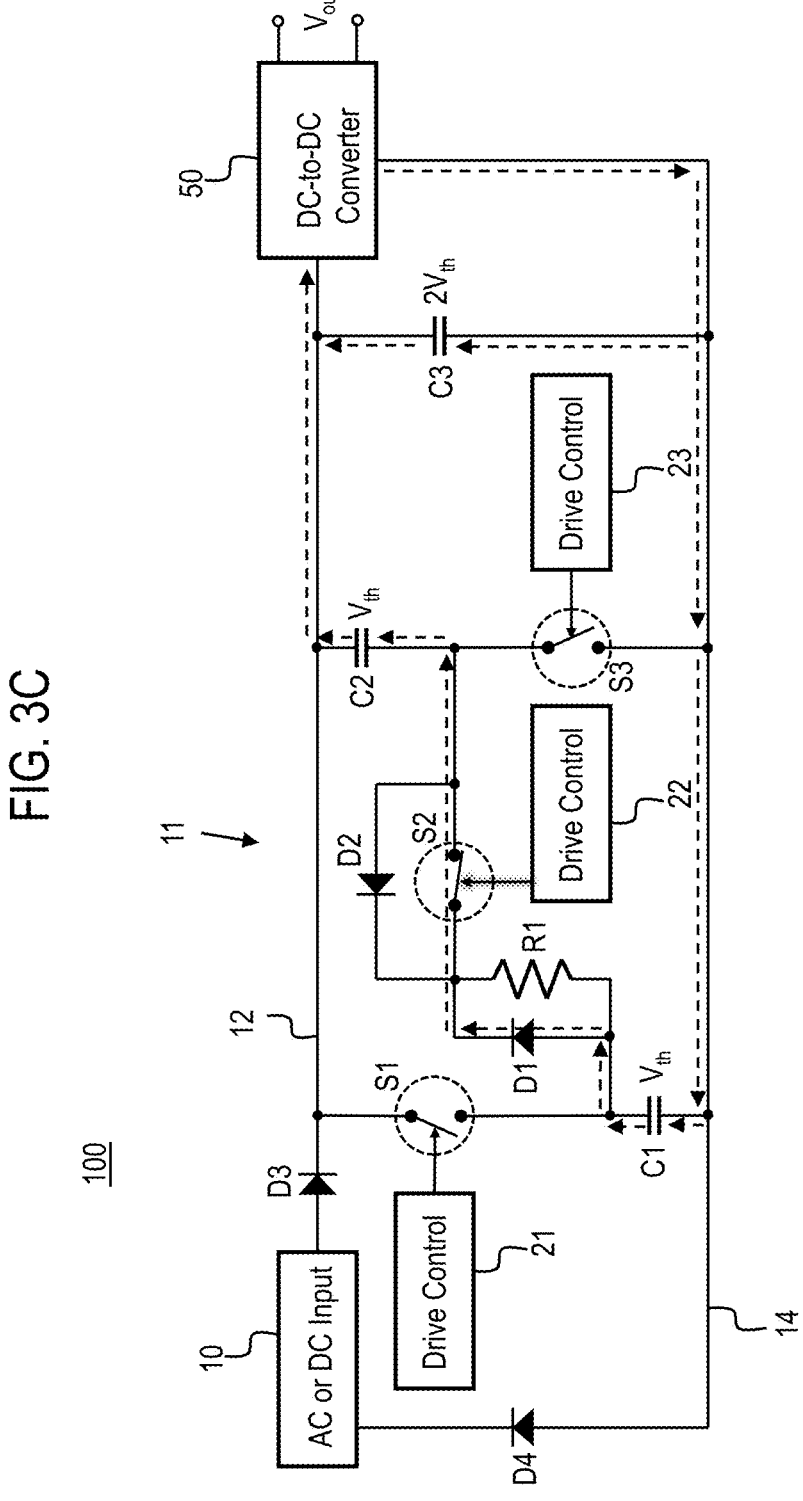
FIG. 3C is a schematic diagram illustrating electrical circuitry of the second power supply in a sixth state.

FIGS. 2A-3C illustrate a portion of an example PSU 100. The PSU 100 is one example configuration of the PSU 200. FIGS. 2A-2C illustrate operations of the PSU 100 during an initial startup and charging phase, with FIG. 2A illustrating a first state, FIG. 2B illustrating a second state, and FIG. 2C illustrating a third state. FIGS. 3A-3C illustrate operations of the PSU 100 during an input power loss event, with FIG. 3A illustrating a fourth state, FIG. 3B illustrating a fifth state, and FIG. 3C illustrating a sixth state.

As shown in FIG. 2A, the PSU 100 comprises an AC or DC input 10, holdup circuitry 11, and a DC-to-DC Converter 50.

The AC or DC input 10 may comprise an input (e.g., receptacle, plug, etc.) that can be coupled to a power source, such as mains power source or other power source that provides input power. The input power may be AC or DC power. In cases in which the input power is AC power, diodes D3 and D4 may rectify the input power into DC form. Alternatively, an AC-to-DC converter (not illustrated) may be provided to convert the AC input into DC form. Such an AC-to-DC converter may be disposed between AC or DC input 10 and diode D3, or it may replace diodes D3 and D4, or diodes D3 and D4 may be part of the AC-to-DC converter. Whether an AC-to-DC converter is provided or the diodes D3 and D4 are used for rectification, in either case downstream of the diodes D3 and D4 the electrical signals within holdup circuitry 11 are DC power signals. The diodes D3 and D4 also prevent feedback of power from the PSU 100 to the power source, regardless of whether the input is AC or DC.

The DC-to-DC converter 50 takes the voltage output by the holdup circuitry 11 (e.g., the voltage across the capacitor C3, described below) and converts that voltage to a form more suitable for electronic devices connected to the PSU 100. The voltage output by the holdup circuitry 11 may be referred to herein as the bulk voltage $V_{bulk}$, as the holdup capacitors C1 and C2 may also sometimes be referred to as bulk capacitors. For example, the bulk voltage $V_{bulk}$ may be 400V and the DC-to-DC converter 50 may convert the 400V DC voltage down to an output voltage $V_{out}$ of 12V, for example. Of course, these are merely examples and in practice any other voltage levels can be used. The DC-to-DC converter 50 may be coupled to a load (e.g., components of an electronic device, such as a computer, networking device, etc.), and may supply the output voltage $V_{out}$ thereto. DC-to-DC converters are familiar to those of ordinary skill in the art, and thus the details of the DC-to-DC converter 50 are not described in detail herein.

The bulk voltage $V_{bulk}$ may also be referred to herein by various names, such as an output voltage of the holdup circuitry, an input voltage of the DC-to-DC converter, a voltage across the holdup capacitors, or a voltage of capacitor C3. These all refer to the same voltage.

The PSU 100 may also comprise additional components, such as a power factor correction circuit, fuses, a transorb, electromagnetic interference (EMI) filters, overcurrent and overvoltage protection features, and various other features familiar to those of ordinary skill in the art. This components are omitted from the diagrams to avoid obscuring the other components.

The holdup circuit 11 comprises a supply or high voltage line 12, a ground or low voltage line 14, a first holdup capacitor C1, a second holdup capacitor C2, a high frequency filter in the form of capacitor C3, a first diode D1, a second diode D2, a resistor R1, a first switch S1, a second switch S2, and a third switch S3.

The switches S1, S2, and S3 may comprise any form of electronically controllable switching device, such as a transistor (e.g., MOSFET, JFET, etc.), relay, etc. The switches S1, S2, and S3 may be controlled by drive controls 21, 22, and 23. The drive controls 21, 22, and 23 generate control signals that turn the switches S1, S2, and S3 ON (closed) or OFF (open). In examples in which the switches S1, S2, an S3 are transistors, the control signals may be connected to the gates of the transistors to change the transistors between a conductive (ON or closed) state and a non-conductive (OFF or open) state. The drive controls 21, 22, and 23 may comprise one or more controllers that generate the control signals. Although shown separately for ease of description, some or all of the drive controls 21, 22, and 23 may actually be part of the same circuit or device as one another. For example, in some implementations a single microcontroller may form all of the drive controls 21, 22, and 23. The drive controls 21, 22, and 23 may collectively be referred to as a controller or control circuitry; this terminology does not imply anything about whether the drive controls 21, 22, and 23 are provided as part of the same physical device or separate physical devices.

In some examples, the diode D2 may be an integral part of the second switch S2 rather than a discrete component. For example, in some implementations the second switch is an N-type power MOSFET that has an intrinsic drain to source diode that can serve as the diode D2. In other examples, the diode D2 may be a separate and discrete component.

The first and second holdup capacitors C1 and C2 may have relatively high capacitance value as compared to the capacitance value of the capacitor C3 that acts as a high frequency filter. For example, in some implementations the capacitors C1 and C2 have capacitance value that are at least 10 times greater, and in some cases at least 20 times greater, than the capacitance value of the capacitor C3. For example, in some implementations the capacitors C1 and C2 have capacitances in the range of about 100-500 μF and C3 has a capacitance in the range of about 10-22 μF. The first holdup capacitor C1 is connected between the lines 12 and 14, with the first switch S1 being disposed between the capacitor C1 and the supply line 12. The second holdup capacitor C2 is also connected between the lines 12 and 14, with the third switch connected between the capacitor C2 and the ground line 14. The capacitor C3 is also connected between the lines 12 and 14, but with no switch there between.

In addition, a positive plate of the capacitor C1 (indicated by the +sign in FIG. 2A) is connected to the negative plate of the capacitor C2 (indicated by the −sign in FIG. 2A) via the diodes D1 and D2, the second switch S2, and the resistor R1. More specifically, current can flow from the capacitor C2 to the capacitor C1 via the diode D2 and the resistor R1 (e.g., see FIG. 2B, described below) or current can flow from the capacitor C1 to the capacitor C2 via the diode D1 and the switch S2 but only when the switch S2 is closed (turned ON) (e.g., see FIG. 3C, described below).

Operation of the holdup circuit 11 will now be described with reference to FIGS. 2A-3C. FIG. 2A illustrates an initial state before input power has been supplied to the AC or DC input 10. In this state, the voltages across the capacitors C1, C2, and C3 are zero.

FIG. 2B illustrates a state immediately after input power is supplied. In this state, all of the switches S1, S2, and S3 are in an open (OFF) state. Thus, the capacitors C1 and C2 are connected in series via the diode D2 and resistor R1. As the input voltage is supplied to the supply line 12, current flows to the capacitors C1, C2, and C3 as indicated by the dash-lined arrows in FIG. 2B. This current causes capacitors C1, C2, and C3 to begin to charge. The filter capacitor C3 has a relatively low capacitance, and thus can be charged relatively quickly. Accordingly, the voltage across the capacitor C3 rises rapidly from 0V to $V_{in}$ (the input voltage). This may create an inrush current, but because the capacitor C3 has low capacitance and charges quickly, the inrush is brief in duration and thus does not trigger the overcurrent protections of the PSU 100. The capacitors C2 and C3, on the other hand, have relatively large capacitances and thus take longer to charge. Accordingly, if the capacitors C2 and C3 were connected directly to the lines 12 and 14 in this state, they would draw larger inrush currents for a relatively long amount of time, which may exceed the capacity of the PSU 100 and trigger overcurrent protections. To reduce this inrush current to acceptable levels, the capacitors C1 and C2 are connected together via the resistor R1 while in the initial charging state. The resistor R1 limits the inrush current flowing between C2 and C1, keeping it below overcurrent protection thresholds. Thus, the holdup circuit 11 not only acts to extend holdup time as will be described below, but also serves as an inrush current limiting circuit. This phase of charging may be referred to as a passive charging phase, as the current is passively controlled by the resistor and active driving of the switches S1, S2, and S3 is not needed.

Eventually, the capacitors will become charged from their initial 0V to some intermediate voltages $V_{C1}$ and $V_{C2}$, which are less than the input voltage $V_{in}$, whereupon a next phase of charging will begin. The next phase may be an active charging phase in which the switches S1 and S3 are actively driven so as to finish the charging of the capacitors C1 and C2.

In some examples, the capacitors C1 and C2 may be allowed to charge in the passive charging phase to the fullest extent possible before moving on to the active charging phrase. In this case, the voltages of the capacitors C1 and C2 at the end of the passive charging phase would be $V_{C1}=V_{C2}=\frac{1}{2}V_{in}$ (assuming C1=C2). Note that the maximum voltage that can be reached in the passive charging phase ($\frac{1}{2}V_{in}$) is less than the ultimate desired charged voltage ($V_{in}$) due to the configuration of the circuit in this state. Thus, the active charging phase is used following the passive charging phase to complete the charging of the capacitors C1 and C2.

In other examples, the passive charging phase may be ended before the capacitors reach $\frac{1}{2}V_{in}$, for example after a predetermined amount of time has passed or upon the capacitors C1 and C2 reaching some predetermined charge state (e.g., a predetermined voltage).

As noted above, the active charging phase involves the switches S1 and S3 being driven so as to briefly close (be turned ON) and then open (be turned OFF) repeatedly (e.g., periodically). Each time the switches S1 and S3 are closed, current flows to the capacitors C1 and C2 via the switches S1 and S3, as shown by the dashed arrows in FIG. 2C, thus raising the voltage of the capacitors C1 and C2 by some amount. The time that the switches S1 and S3 are open may be kept brief, to avoid causing too large of an inrush current that would trigger the overcurrent protection thresholds. Thus, in some examples the switches S1 and S3 may be turned on at a predetermined frequency and a predetermined duty cycle that will keep the inrush current to the capacitors C1 and C2 below the overcurrent protection thresholds. This pulsing of switches S1 and S3 on and off may continue until the capacitors C1 and C2 have been fully charged to the input voltage $V_{in}$.

FIG. 2C shows the circuit 10 in a state in which the switches S1 and S3 are closed. In this state, because S1 is closed, current can flow directly from supply line 12 to the positive plate of the capacitor C1, thus increasing the voltage across the capacitor. After a number of ON pluses for switch S1, voltage of capacitor C1 eventually rises from $V_{C1}$ to $V_{in}$. Moreover, because S3 is closed, current can flow from the negative plate of the capacitor C2, thus increasing the voltage across C2. After a number of ON pluses for switch S3, voltage of capacitor C2 eventually rises from $V_{C2}$ to $V_{in}$.

Once the capacitors C1 and C2 are charged, the switches S1 and S2 may be left ON during normal operation. This state, with the switches S1 and S2 ON and the switch S2 OFF, corresponds to the first configuration of the holdup circuit 11 mentioned above, in which the capacitors C1 and C2 are connected in parallel.

Figure 4:
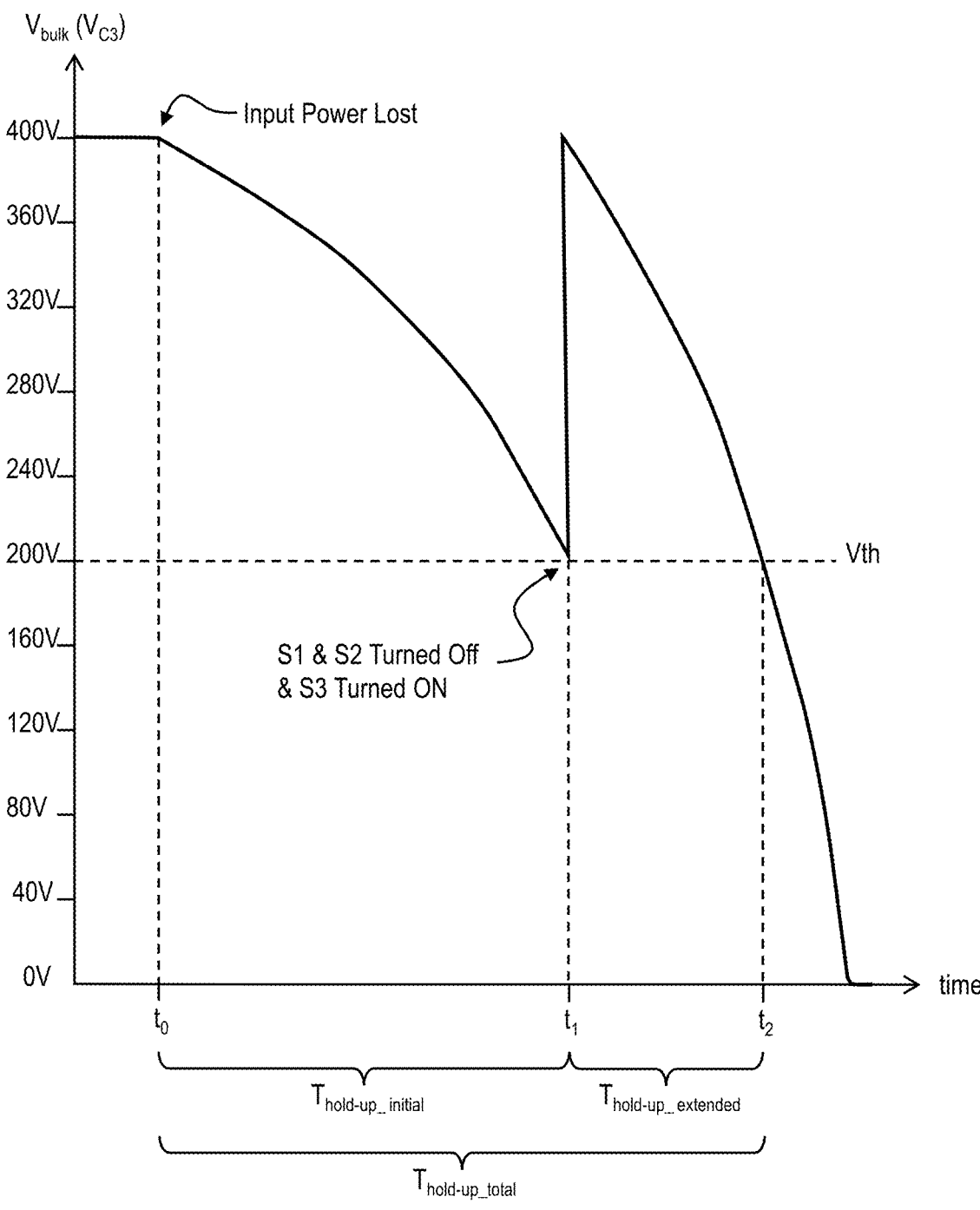
FIG. 4 is a graph illustrating a bulk voltage over time.

Turning now to FIGS. 3A-4, the operation of the holdup circuit 11 in response to a loss of input power will be described.

FIG. 3A illustrates the state of the circuit 11 immediately after input power is lost. That is, FIG. 3A illustrates the state of the circuit 11 between the times $t_0$ and $t_1$ as shown in FIG. 4. Because there is no input power, the capacitors C1, C2, and C3 begin to discharge at $t_0$, as indicated by the dash-lined arrows in FIG. 3A. This discharge current from the capacitors continues to supply power to the DC-to-DC converter 50, and thus the DC-to-DC converter 50 is able to continue supplying the output voltage $V_{out}$ to the downstream electronic components. Over time, the voltage across the capacitors C1, C2, and C3 ($V_{bulk}$) will decrease from the original voltage ($V_{in}$) to a lower voltage, as shown in FIG. 4. Eventually, the voltage across the capacitors C1, C2, and C3 will reach a threshold voltage $V_{th}$. This is shown as time $t_1$ in FIG. 4. In response to this, the drive controls 21 and 23 cause the switches S1 and S3 to open (turn OFF), as shown in FIG. 3B. Immediately thereafter, the drive control 22 causes the switch S2 to close (turn ON), as shown in FIG. 3C. In this state, with the switches S1 and S3 open and the switch S2 closed, the capacitors C1 and C2 are now connected in series. This has the effect of increasing the voltage across the capacitors C1 and C2. In particular, if it is assumed that the capacitances of the capacitors C1 and C2 are equal, then the voltage will double. Thus, as shown in the example of FIG. 4, if the threshold voltage $V_{th}$ is equal to 200V, then the voltage across the capacitors will double to 400V. Thereafter, the capacitors C1 and C2 will continue to discharge, except now in series, as indicated by the dash-lined arrows in FIG. 3C. This causes the voltage across the capacitors to decrease with time, as shown in FIG. 4 in the period from $t_1$ to $t_2$. At time $t_2$, the voltage again reaches the threshold voltage $V_{in}$. As the voltage drops below this threshold, the DC-to-DC converter 50 may no longer be able to continue reliably producing the output voltage $V_{out}$ within specifications, and thus the PSU 100 may turn off. This marks the end of the holdup time, denoted $T_{holdup\_total}$ in FIG. 4.

In some examples, the threshold $V_{in}$ is set to be equal to (or a predetermined amount greater than) the minimum voltage that is needed to keep the DC-to-DC converter 50 operating within specifications. In some examples, the DC-to-DC converter 50 may have a 400V nominal input voltage, but can continue operating within specifications with a 300V input voltage, in which case $V_{th}$ may be set to 300V. In some examples, the DC-to-DC converter 50 may have a 400V nominal input voltage, but can continue operating within specifications with a 200V input voltage, in which case $V_{th}$ may be set to 200V. Of course, different converters may have different operating ranges, and thus $V_{th}$ may vary from one implementation to the next. In the discussion below, it is assumed that $V_{th}$ equals 200V, and that this corresponds to the minimum input voltage for the DC-to-DC converter 50.

The operations described above have the effect of extending the holdup time of the PSU 100, as will be described in greater detail below with reference to FIG. 4. The holdup time is generally considered to be the time between when the input power is lost and when the bulk voltage drops to the minimum accepted input level for the downstream converters. Thus, if $V_{th}$ is assumed to be the same as the minimum input voltage of the converter 50, then the period labeled $T_{holdup\_initial}$ in FIG. 4 would represent the total holdup time in a conventional system with equivalent capacitors, because after $t_1$ the system would fall below the threshold $V_{th}$. However, because in examples described herein the capacitors C1 and C2 are changed from the first configuration to the second configuration at time $t_1$, the holdup time does not actually end at time $t_1$ in examples disclosed herein. Instead, at time $t_1$ the voltage increases substantially, and thus the PSU can continue operating. This provides an additional period of time during which the capacitors C1 and C2 can continue to discharge, which is labeled $T_{holdup\_extended}$ in FIG. 4. Eventually, at time $t_2$ the voltage returns back to $V_{th}$. At this time, there is no longer any ability to boost the voltage and therefore the voltage will drop below the threshold after $t_2$. Thus, the total holdup time $T_{holdup\_total}$ goes from time $t_0$ to $t_2$.

The total holdup time $T_{holdup\_total}$ can be calculated theoretically as follows. The power supplied by the capacitors C1 and C2 during the time periods $t_{holdup\_initial}$ and $t_{holdup\_extended}$ are described by the following equations:

$$P \cdot T_{holdup\_initial} = \frac{1}{2}(C1 + C2)\left(V_{in}^2 - V_{th}^2\right)$$

$$P \cdot T_{holdup\_extended} = \frac{1}{2}\left(\frac{C1 \cdot C2}{C1 + C2}\right)\left((2V_{th})^2 - V_{th}^2\right)$$

wherein P is the power delivered to output load, C1 is the capacitance of the capacitor C1, and C2 is the capacitance of the capacitor C2. Combining these equations, and assuming that C1=C2 and that $V_{in}=2V_{th}$, it can be seen that $t_{holdup\_extended}=0.5*t_{holdup\_initial}$. This means that the total holdup time $T_{holdup\_total}=1.5*T_{holdup\_initial}$. In other words, the total holdup time has been extended by approximately 50% as compared to that which would be achievable using the same capacitors in prior PSUs, all other things being equal.

In the example above, $V_{in}$ is set to the minimum allowable input voltage to make it easier to show how the holdup time in present examples would compare to the holdup time in a conventional approach. However, in some examples the threshold $V_{th}$ may be set to a value a little higher than the minimum voltage to build in some safety margin, and in this case the total holdup time would be slightly less than 1.5 times more than the conventional holdup time.

As noted above, if everything else is equal, the circuit described herein can increase holdup time as compared to conventional approaches. However, if increased holdup time is not needed, then the circuit described herein can allow the same holdup time to be achieved as with conventional approaches while using capacitors with lower capacitance. In other words, rather than holding capacitance constant and changing the holdup time, the holdup time may be held constant and the capacitances may be changed. Lower capacitance capacitors may be less expensive and smaller, which may be beneficial when holdup time is already sufficient.

Figure 5:
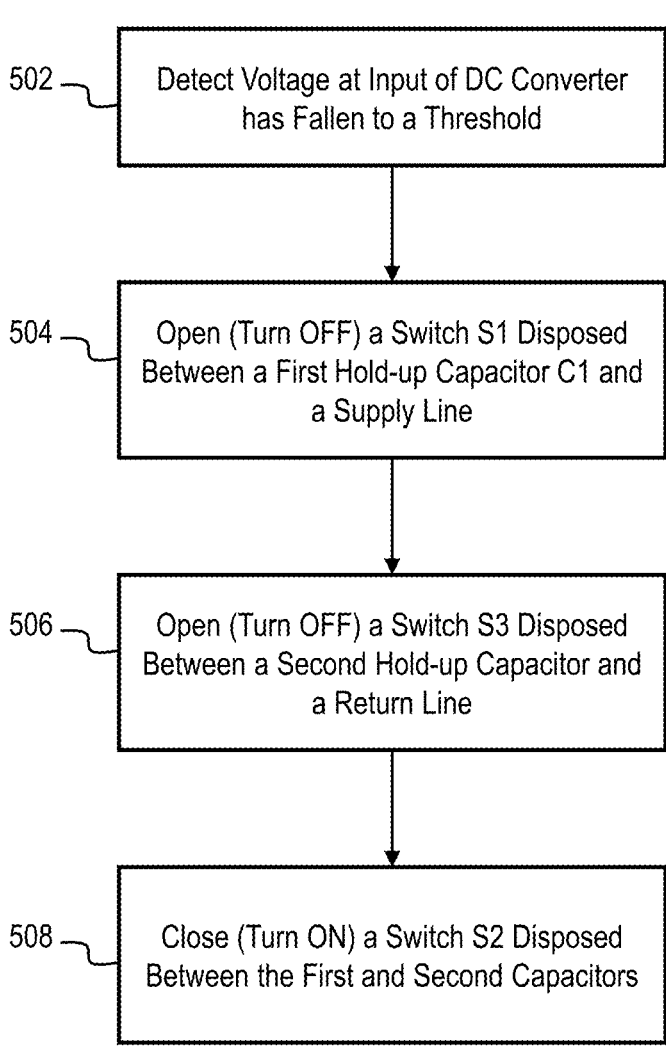
FIG. 5 is a process flow diagram illustrating an example method.

Turning now to FIG. 5, an example method is described. The method may be performed, for example, by a controller of a power supply unit.

In block 502, the controller detects that the voltage at the input of the DC-to-DC converter of a PSU has fallen to a threshold level $V_{th}$. In some examples, $V_{th}$ may be a level that is equal to, or slightly greater than, a minimum input voltage that is acceptable to the DC-to-DC converter.

In block 504, in response to detecting that the voltage is at $V_{th}$, the controller opens (turns OFF) the first switch S1, which is disposed between the first holdup capacitor C1 and the supply line 12.

In block 506, in response to detecting that the voltage is at $V_{in}$, the controller opens (turns OFF) the third switch S3, which is disposed between the second holdup capacitor C2 and the ground line 14. In some examples, block 504 is performed before block 506. In other examples, block 506 is performed before block 504. In still other examples, blocks 504 and 506 are performed concurrently.

In block 508, after blocks 504 and 506 have been performed and the switches S1 and S3 are open, the controller closes (turns ON) the second switch S2 disposed between the first and second capacitors C1 and C2. This corresponds to changing the holdup circuit from the first configuration, in which the capacitors are in parallel, to the second configuration, in which the capacitors are in series.

Figure 6:
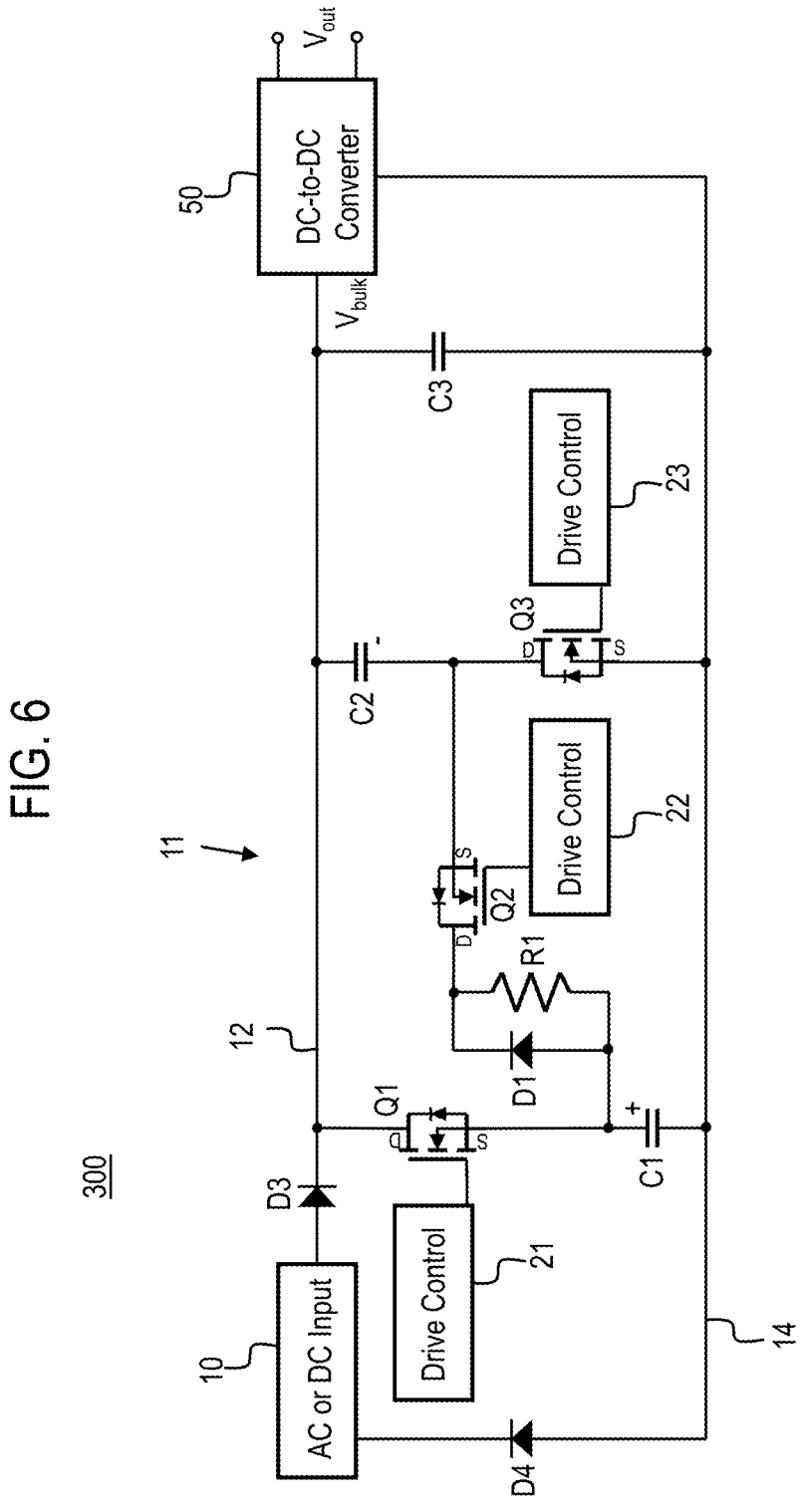
FIG. 6 is a schematic diagram illustrating electrical circuitry of the third example power supply.

FIG. 6 illustrates an example PSU 300. The PSU 300 may be an example configuration of the PSU 100 or of the PSU 200. Many of the components of the PSU 300 are the same as components of the PSU 100. The same references numbers are used in the figures for these similar components, and duplicative descriptions thereof are omitted. The PSU 300 is essentially the same as the PSU 200 except that the switches S1 to S3 in PSU 200 are instantiated in the PSU 300 as N-channel power MOSFETs with intrinsic diodes (body-diodes) Q1 to Q3. Because the intrinsic (body) diode of the MOSFET Q2 can serve as the diode D2 of the PSU 200, and the diode D2 is omitted from the diagram. The PSU 300 operates in the same manner as already described above in relation to the PSU 200, and thus duplicative description thereof is omitted.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A power supply unit comprising:
holdup circuitry comprising:
    a supply line;
    a ground line;
    a first holdup capacitor;
    a second holdup capacitor; and
    switching circuitry configured to switch the holdup circuitry between a first configuration in which the first holdup capacitor and second holdup capacitor are coupled in parallel between the supply line and the ground line and a second configuration in which the first holdup capacitor and second holdup capacitor are coupled in series between the supply line and the ground line; and
a controller configured to detect that an output voltage of the holdup circuitry has dropped to a threshold voltage and, in response, control the switching circuitry to cause the holdup circuitry to change from the first configuration to the second configuration;
wherein the first holdup capacitor is coupled to the ground line and is selectively couplable to the supply line by a first switch of the switching circuitry;
wherein the first holdup capacitor is selectively couplable to the second holdup capacitor by a second switch of the switching circuitry; and
wherein the second holdup capacitor is coupled to the supply line and selectively couplable to the ground line by a third switch of the switching circuitry; and a first diode connecting the first holdup capacitor to the second switch and a resistor connecting the first holdup capacitor to the second switch in parallel to the second diode.

2. The power supply unit of claim 1,
wherein in the first configuration the first and third switches are on and the second switch is off; and
wherein in second configuration the first and third switches are off the second switch is on.

3. The power supply unit of claim 2,
wherein the controller is configured to cause the holdup circuitry to change from the first configuration to the second configuration by:
turning off the first switch;
turning off the third switch; and
after having turned off the first switch and the third switch, turning on the second switch.

4. The power supply unit of claim 1, further comprising a second diode connecting the second holdup capacitor to resistor.

5. The power supply unit of claim 4, wherein the second switch comprises an N-channel power MOSFET and the second diode comprises an intrinsic diode of the second switch.

6. The power supply unit of claim 1,
wherein the controller is configured to partially charge the first and second holdup capacitors by placing the first and third switches in an off state while input voltage is supplied to the supply line and ground line such that an inrush charging current to the first and second holdup capacitors flows through and is limited by the resistor.

7. The power supply unit of claim 6,
wherein the controller is configured, upon having partially charged the first and second holdup capacitors to a predetermined level, complete the charging of the first and second holdup capacitors to the input voltage by periodically turning on the first and third switches at a predetermined frequency and duty cycle to limit inrush current to below an overcurrent threshold.

8. The power supply unit of claim 1,
further comprising a DC-to-DC converter configured to receive the output voltage of the holdup circuitry as an input and to generate a converter output voltage at a specific voltage to be supplied to a load.

9. The power supply unit of claim 8,
wherein the threshold voltage comprises a minimum input voltage that the DC-to-DC converter can receive and still continue to generate the converter output voltage at the specific voltage.

10. The power supply unit of claim 1, wherein an input voltage to the holdup circuitry is 400V and the threshold voltage is 200V.

11. The power supply unit of claim 1,
wherein an input voltage to the holdup circuitry is 400V and the threshold voltage is 300V.

12. The power supply unit of claim 1,
further comprising a third capacitor forming a high frequency filter, the third capacitor coupled to the ground line and the supply line.

13. The power supply unit of claim 12,
wherein a capacitance of the first holdup capacitor is at least ten times higher than the capacitance of the third capacitor.

14. A power supply unit comprising:
an AC or DC input;
a supply line and a ground line connected to the AC or DC input to an input voltage;

a first holdup capacitor coupled to the ground line;

a first switch selectively coupling the first holdup capacitor to the supply line;

a second holdup capacitor coupled to the supply line;

a second switch selectively coupling the first holdup capacitor to the second holdup capacitor;

a third switch selectively coupling the second holdup capacitor to the ground line;

a third capacitor coupled to the supply line and the ground line;

control circuitry configured to control the first, second, and third switches, wherein the control circuitry is configured to detect that a voltage across the third capacitor has dropped to a threshold voltage and, in response, turn off the first and third switches and turn on the second switch;

a first diode connecting the first holdup capacitor to the second switch;

a resistor connecting the first holdup capacitor to the second switch in parallel with the first diode;

a second diode connecting the second holdup capacitor to the resistor.

\* \* \* \* \*